United States Patent Office 3,299,417
Patented Jan. 17, 1967

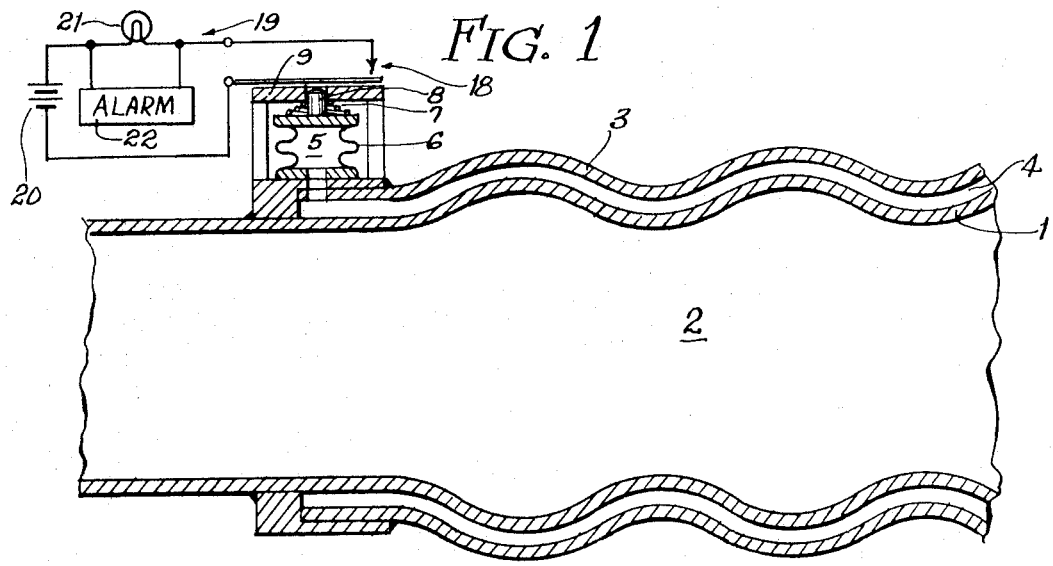
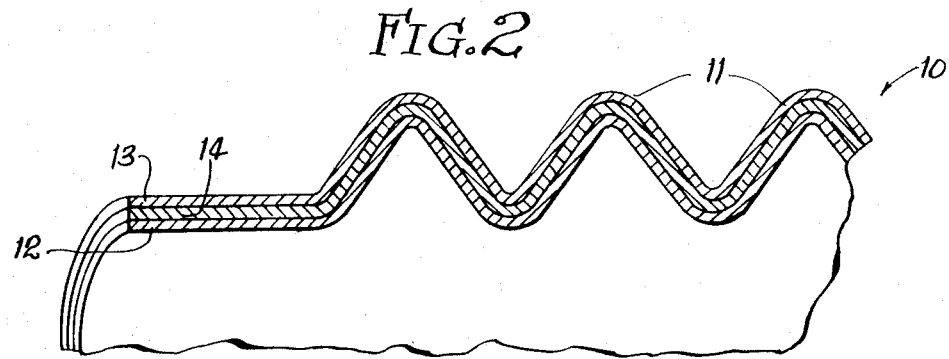
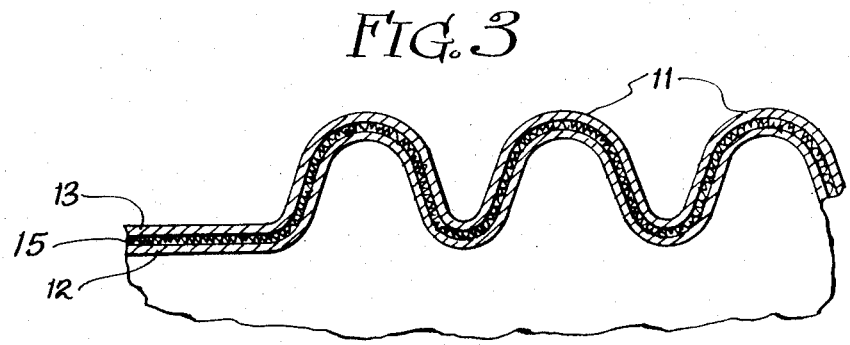

3,299,417
FLEXIBLE PRESSURE TUBES AND CONDUITS
Anthony M. Sibthorpe, Romford, Essex, England, assignor to DK Manufacturing Company, Batavia, Ill., a corporation of Illinois
Filed July 23, 1963, Ser. No. 297,004
Claims priority, application Great Britain, July 24, 1962, 28,330/62
2 Claims. (Cl. 340—242)

This invention relates to flexible pressure tubes and ducts of the kind in which the wall of the tube or duct consists of metal and is made flexible by circular or helical convolutions so that the tube or duct has an undulated profile in longitudinal section. It is an object of the present invention to provide a tube or duct of the kind specified which incorporates means for protection against leakage. According to the present invention a convoluted tube or duct has two walls separated by a narrow gap which may be of the order of 0.015 inch, the inner wall serving to normally confine the pressure medium inside the tube or duct, and the outer wall forming a closed chamber or jacket with the inner duct, which is preferably arranged to communicate with a pressure-responsive signal device, to produce a signal when the pressure in the jacket rises due to leakage from the interior of the duct or tube through the inner wall. More particularly, in cases in which the pressure in the tube or duct is normally substantially above atmospheric pressure, the jacket may be arranged to be normally under atmospheric pressure or a slightly reduced pressure. On the other hand, particularly when the pressure inside the tube or duct is below or only slightly above atmospheric pressure, it may be preferred to evacuate the jacket space in order to obtain a reliable signal in the case of leakage through the inner wall. The signal device may comprise a bellows or diaphragm capsule communicating with the jacket space, the expansion of this capsule or the like being utilized to produce a signal. In a simple case the expansion may cause a button or stud which is normally recessed behind a surface, to project from the surface, either to serve itself as a signal or, for example, to close an electric signal circuit.

There are several ways in which a convoluted tube or duct having two closely spaced walls may be produced. Thus, in the case of a helically convoluted tube, two helically convoluted tubes of different diameters may be simply screwed one into the other. An alternative method, which is applicable to ducts having parallel convolutions, consists in convoluting a composite tube comprising two coaxial cylindrical tubes of the metal from which duct is to be constructed, spaced from each other by a layer of a low-melting ductile alloy; for example, the material obtainable under the trade name "Cerrabend," and then heating the convoluted tube or duct to remove the separating layer by causing it to melt and flow out through one end of the twin-walled tube or duct. The composite tube may alternatively be formed by slipping two tubes of the desired metal respectively into and over a tube of a low-melting metal, employing if necessary different temperatures for the individual tubes to facilitate the insertion, or by injecting the low-melting metal in the fused state into the gap between the coaxially arranged cylindrical tubes from which the inner and outer walls are respectively to be formed. According to a modification on the invention, the twin-walled convoluted tube or duct may be formed by deformation of a composite cylindrical tube in which inner and outer cylindrical solid metal walls are spaced by a gas-pervious layer of suitable mechanical characteristics; for example, by a layer of metal braid.

Further objects, advantages and features of the present invention will appear from the following description, taken with the accompanying drawings, in which:

FIG. 1 is a somewhat diagrammatic axial section of a length of a tube or duct according to the present invention.

FIG. 2 is an axial section showing one method of making the double-walled convoluted tube or duct.

FIG. 3 is a fragmentary axial section showing another method of making the double-walled tube, using a wire braid between the walls.

The tube or duct 1a of FIG. 1 has an inner wall 1 confining the duct passage 2 and an outer wall 3 spaced from the inner wall 1 by a narrow gap 4, for example, of .015 of an inch thickness, the gap or jacket 4 being sealed at the ends of the duct. A chamber 5, communicating with the jacket 4, contains a diaphragm capsule or bellows 6. When a leak of any kind occurs in the inner wall 1, pressure from the passage 2 will enter the gap 4 and capsule space 5 and act to expand the capsule 6, whereby a signal button 8 is moved against the force of a light spring 7, from the illustrated position, in which its end is flush with or recessed from the outer surface of a signal panel 9, to a warning position in which the button 8 projects from that surface.

FIG. 2 illustrates one method of making a double-walled flexible tube or conduit 10 having parallel convolutions or corrugations 11 extending around the periphery of the tube. It will be seen that the tube 10 comprises an inner wall 12 and an outer wall 13. Initially, the walls 12 and 13 are cylindrical, as shown in the left-hand portion of FIG. 2. In practicing this method, the walls 12 and 13 are separated by a tube or layer 14 made of a fusible material, such as a low melting point metal alloy, which preferably is ductile so that it will withstand the formation of the convolutions 11 without cracking. The fusible tube or layer 14 maintains the spacing between the inner and outer walls 12 and 13 during the formation of the convolutions 11. After the convolutions 11 have been formed, the tube 10 is heated so as to melt the fusible material of the wall 14. The fusible material is drained away to provide the desired space between the inner and outer walls 12 and 13.

Initially, the intermediate tube or layer 14 may be cast between the inner and outer walls 12 and 13 by pouring molten metal between the walls 12 and 13. Alternatively, the intermediate wall 14 may be formed as a separate tube which can be slipped into the outer tube 13. The inner tube 12 is then slipped into the intermediate tube 14.

FIG. 3 illustrates a modified construction in which the inner and outer walls 12 and 13 are separated by an intermediate wall or layer 15 which is pervious to air or other gases so that the intermediate wall 15 may be left in place after the convolutions 11 have been formed. The gas-pervious layer 15 may take the form of a layer of wire braid which effectively maintains the separation between the inner and outer walls 12 and 13 when the convolutions 11 are formed. Initially, before the convolutions are formed, the wire braid may be slipped over the inner wall 12, and then the outer wall 13 may be slipped over the wire braid. It will be understood that the wire braid permits gas to flow through the space between the inner and outer walls 12 and 13 so that the signal of the present invention will be operated if a leak develops in the inner wall 12.

As shown in FIG. 1, the button 8 may be arranged to close an electrical switch 18 to provide an additional signal, supplementing the signal which is provided by the movement of the button itself. The switch 18 is connected in an electric signal circuit 19 which is energized by a battery 20 or other source of power. The closure of the switch 18 may energize a signal lamp 21 and any other signal or alarm device 22 which may be desired, such as a buzzer, bell, annunciator or the like.

As will be seen from the above description, the invention provides a twin-wall hose or duct which in the case of the failure of the inner pressure carrying liner will continue to function due to the fact that the outer liner takes over the duty of the inner liner, and which at the same time will make a signal available to indicate that the inner liner has failed. The invention therefore acts as a fail-safe device permitting the continued operation of the hose or duct although the inner liner has failed.

I claim:

1. In a flexible metal conduit,
the combination comprising a double-walled metal tube having concentric inner and outer annular metal walls with a closed annular space therebetween,
said walls being formed with interlocking convolutions whereby said walls are rendered flexible,
a layer of flexible metal wire braid mounted in said annular space and maintaining the space between said inner and outer walls, said flexible metal wire braid being closely confined between said interlocking convolutions,
and a pressure responsive device connected to said annular space between said inner and outer walls for indicating any change in the pressure in said space,
said braid being pervious to fluids so that any change in the fluid pressure anywhere in said space will be transmitted to said pressure responsive device.

2. In a flexible metal conduit,
the combination comprising a double-walled metal tube having concentric inner and outer annular metal walls with a closed annular space therebetween,
said walls being formed with interlocking convolutions whereby said walls are rendered flexible,
and a layer of flexible metal wire braid mounted in said annular space and maintaining the space between said inner and outer walls, said flexible metal wire braid being closely confined between said interlocking convolutions of said walls.

References Cited by the Examiner

UNITED STATES PATENTS

| | | | |
|---|---|---|---|
| 529,216 | 11/1894 | Tatham | 138—139 |
| 746,630 | 12/1903 | Greenfield | 138—139 X |
| 992,581 | 5/1911 | Noonan et al. | 138—121 X |
| 1,962,168 | 6/1934 | Andrus | 340—242 |
| 2,151,092 | 3/1939 | Dunsheath | 340—242 |
| 2,203,460 | 6/1940 | Fieber | 73—406 X |
| 2,326,557 | 8/1943 | Pierce | 340—242 X |
| 2,691,773 | 10/1954 | Lichtenberger | 340—242 |
| 2,683,928 | 7/1954 | Carson | 29—523 |
| 2,695,446 | 11/1954 | Meyer | 29—523 |
| 2,767,392 | 10/1956 | Szwargulski | 340—242 |

NEIL C. READ, *Primary Examiner.*

D. K. MYER, *Assistant Examiner.*